Oct. 26, 1971     O. BUSSE ET AL     3,615,015

FILTER PRESS

Filed Oct. 23, 1969     2 Sheets-Sheet 1

INVENTORS
OSWALD BUSSE
HUGO KLESPER

BY *Larson and Taylor*

ATTORNEYS

United States Patent Office 3,615,015
Patented Oct. 26, 1971

3,615,015
FILTER PRESS
Oswald Busse and Hugo Klesper, Michelbach, Germany, assignors to Passavant Werke, Michelbacherhutte, Germany
Filed Oct. 23, 1969, Ser. No. 868,792
Claims priority, application Germany, Oct. 29, 1968, P 18 05 893.0
Int. Cl. B01d 25/12
U.S. Cl. 210—231                                                  12 Claims

ABSTRACT OF THE DISCLOSURE

A filter press wherein the effective filtering area may be enlarged by the construction whereby the space between adjacent filter plates is sub-divided into chambers, each isolated from each other but in fluid communication with corresponding chambers in the spaces between adjacent filter plates. A separate fluid conveyance device may be provided for each group of connected chambers.

BACKGROUND OF THE INVENTION

This invention relates to filter presses of the type used in waste treatment or the like for separating a solid from a liquid. In particular, the invention relates to a construction which will permit the application, in filter presses of the present type, of filter plates having a greater effective surface area.

The efficiency of a filter press of the present type is dependent upon the size of the filter plates, and more specifically, the size of the effective filtering area presented by each filter plate. To increase efficiency, it is therefore necessary to increase the size of the plates as much as possible thereby increasing the effective surface area of the plates without a proportionate increase in manufacturing costs. Clearly it would be more economical to provide one large filtering press rather than a plurality of smaller parallel filtering presses each requiring its own sealing system, pumping system, and the like.

However, in view of certain constructional and operational problems, an upper limit on size may have been reached with respect to known filter presses of the present type.

One of these problems is that larger filter plate surface areas require larger feed passages for introducing influent to the chamber and this in turn considerably increases the demand placed upon the pumping apparatus for feeding the influent material to be treated to the chambers between the filter plates. One attempt to solve this latter problem was to use two or more pumps, arranged in paallel for feeding the influent material to the filter press. However, this arrangement has proved unsatisfactory.

Because of the pulsating flow of influent to the press, the demands on the switching arrangement were too great and the net result was that the conveying capacity was greatly reduced and large sudden pressure thrusts were created. These disadvantages are quite serious as they could easily result in breakage to the filter plates.

Another problem limiting the size of the filter plates is that the larger plates are far more susceptible to breakage. Even relatively low pressure differentials across a given plate may result in a distortion of that plate, and hence breakage. It is of course known to reduce this danger of breakage by installing in the space between adjacent filter plates spacing elements which give support in addition to that support provided by the borders of adjacent filter plates. However, beyond a certain size, even these spacing elements prove inadequate, and in any event they have the further disadvantage in that they impede the flow of influent material within the filter chambers.

Thus, there exists a need for a new and improved arrangement which will permit enlarging the size of filter plates while concurrently maintaining efficient and economical construction and operating conditions.

SUMMARY OF THE INVENTION

Thus, it is a purpose of the present invention to provide a new and improved filter press construction wherein the filter plates of the press may be increased in size without the disadvantages of the prior art.

This purpose is achieved by constructing the individual filter plates of the filter press such that the spaces or chambers between them are sub-divided into smaller chambers which are isolated from each other but which are in fluid communication with corresponding chambers in adjacent spaces. Each group of connected chambers includes its own pump means and its own passages for introducing influent material to be filtered.

In a preferred embodiment of the invention, the filter plates include a raised separating wall which cooperates with a similar wall on an adjacent filter plate to divide the filter area between those two plates into two or more separate filter chambers. Filter plates of the present type normally include a raised border which, together with the raised border of an adjacent filter plate, form a seal for the overall filter area between the two said plates. In a preferred embodiment of the invention the separating walls are raised to a height equal to the height of their respective outer borders.

Each filter plate may include one or a plurality of separating walls thereby dividing the overall filtering area into two, four or more individual chambers. In a filter press having a large number of filtered plates, all similarly shaped, each sub-divided chamber will be aligned with corresponding chambers in the adjacent spaces between the other filter plates. A passageway is included to place all of these aligned chambers into fluid communication with each other and a separate pumping means introduces fluid to only the said aligned chambers, whereby the influent material from the said pumping means fills only the said aligned chambers. A separate pumping means and a separate set of passageways is then provided for each separate set of aligned chambers. Each chamber may further include an individual channel for the discharge of purified liquid.

In one embodiment of the invention the influent passages may extend directly through the filter chambers. In another embodiment of the invention the influent passageways may be located in the outer border of the filter plates.

In accordance with another feature of the invention, the individual filter plates may be separated and a frame element my be placed therebetween, said frame element mating with both the separating walls and the outer borders to form the said chambers.

Thus, since each set of aligned chambers has its own pumping means, the overall size of the filter plates can be greatly increased without requiring the use of large pumps which would otherwise exceed practical and economic demands. More specifically, this permits the use of a separate membrane pump with each set of aligned chambers, this pump being advantageous for use with influent material such as waste material or the like.

Another feature of the present invention includes the use of an accumulator at the end of the filter press opposite from that at which the influent material is introduced, for damping pressure thrusts, et cetera. A single accumulator can be connected to the individual groups of aligned chambers either via separate lines, each having its own isolating valve, or through a single line having a single valve, which line is in turn connected with all of the groups of aligned chambers.

Thus, it is a purpose of the present invention to provide a new and improved filter press which overcomes certain disadvantages of filter presses known heretofore.

It is another object of this invention to provide a new and improved filter press construction which may be much larger in size without requiring a proportionate increase in cost or a proportionate reduction in operating efficiency.

It is another object of this invention to provide a new improved filter press wherein the overall filter area is sub-divided into chambers, isolated from each other but in fluid communication with aligned chambers and spaces between adjacent plates thereby forming separate groups of aligned chambers.

It is still another object of this invention to provide a new and improved filter press of the present type wherein the overall filtering area is sub-divided into a plurality of smaller areas, each having its own influent passage and its own pumping means.

Other objects and the attendant advantages of the present invention will become apparent from the detailed description to follow together with the accompanying drawings.

BRIEF DESCRIPTION OF THE DRAWINGS

There follows a detailed description of preferred embodiments of the invention to be read together with the accompanying drawings, the said description and the said drawings being provided only for purposes of illustration.

DETAILED DESCRIPTION OF THE PREFERRED EMBODIMENTS

Figure 1:
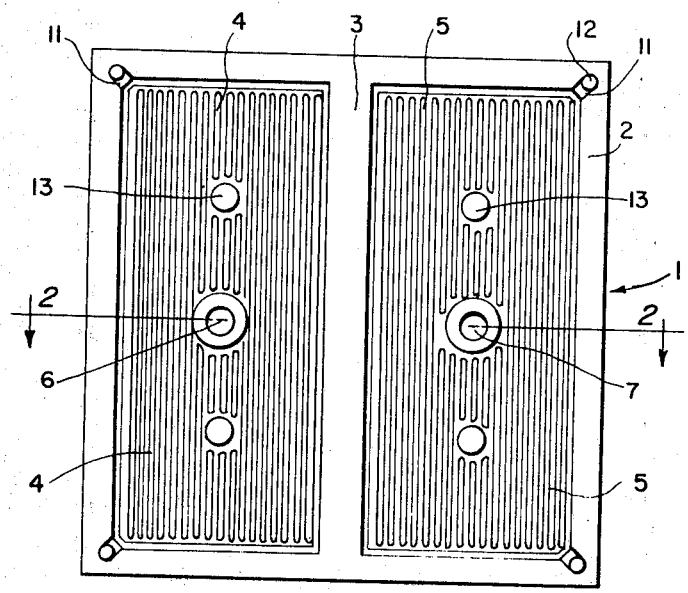
FIG. 1 is an elevational view of a filter plate constructed in accordance with the features of the present invention and viewed in a plane taken along line 1—1 of FIG. 2.

Referring now to the drawings, like numbers represent like elements throughout the several views.

Figure 2:
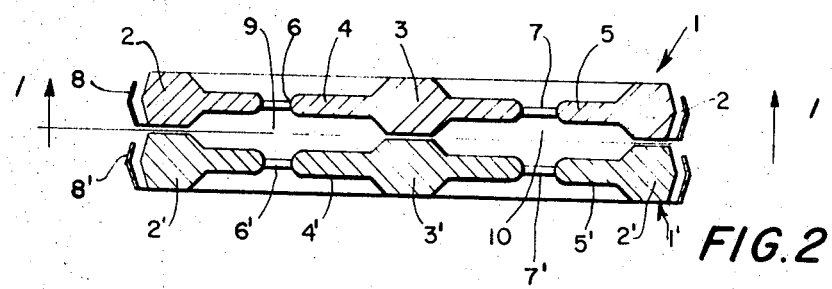
FIG. 2 is a sectional view taken along line 2—2 of FIG. 1 and showing both the filter plate of FIG. 1 and an additional plate adjacent thereto.

FIGS. 1 and 2 illustrate a filter plate 1 constructed in accordance with the features of the present invention. FIG. 2 shows, in addition, an adjacent filter plate 1' which is identical to the filter plate 1. For this reason all elements in the filter plate 1' are represented by numerals corresponding to those used for the filter plate 1 but including a prime ('). The filter plate 1 includes an outer border 2 surrounding the filter plate 1 and raised relative to recessed panels 4 and 5. In accordance with a feature of the present invention, the panels 4 and 5 are separated by a raised separating wall 3.

Filter chambers 9 and 10 are formed between the panels 4 and 4' and 5 and 5', respectively. The panel 4 includes a central opening or passageway 6 for the introduction of influent material to be filtered. The panel 5 includes a similar opening 7.

Referring specifically to FIG. 2, the raised border 2 and the raised separating wall 3 sealingly engage their corresponding elements 2' and 3' on the adjacent filter plate thereby forming a fluid seal about each of the chambers 9 and 10. Each filter plate is covered by a cloth 8 which is pressed against its respective frame. Preferably the separating walls 3 are raised from the recessed portions of the filter plates by an amount equal to that by which the outer borders 2 are raised.

Each filter plate includes openings 11 in the border 2 for discharging liquid purified during the filtering operation, this liquid then leaving the apparatus through channels 12. The channels 12 can be independent for each filter plate or they can be interconnected to discharge the liquid at a single point. The filter plates may also include spacing elements 13 to offer additional support for the filter plates, thereby further reducing the possibility of breakage.

Figure 3:
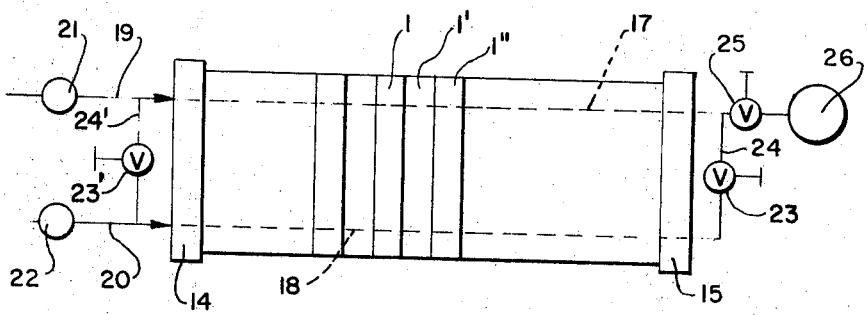
FIG. 3 is a schematic illustration of a filter press including the filter plates of FIGS. 1 and 2.

FIG 3 is a schematic of a filter press incorporating, between end plates 14 and 15 a plurality of filter plates. Although the entire space between end plates 14 and 15 would normally be occupied by filter plates, for convenience in FIG. 1 only a few of these filter plates are shown, these including the plates 1 and 1' of FIGS. 1 and 2. Assuming all filter plates are identical to the plates shown in FIGS. 1 and 2, then all of the openings 6 will form a continuous successive channel designated as 17 in FIG. 3. Similarly, the openings 7 will form a continuous channel 18.

The channel 17 is supplied with influent material to be filtered through an influent pipe 19 which is provided with a pump 21, preferably a piston membrane pump. The channel 18 is then provided with its own separate influent pipe 20 and its own separate pump 22. Thus, the two groups of aligned chambers, represented by channels 17 and 18, respectively, may be fed with influent material independent from each other so that the operation of each pump will not interfere with the operation of the other.

On occasion it may be desirable to balance the pressure between the two groups of chambers. For this purpose, and as shown in FIG. 3, the filter press may include connection lines 24 or 24' provided with valves 23 and 23' which connect the influent material of the two groups of chambers at the rear end of the press and at the supply end of the press, respectively. At the rear end of the press the pressure thrusts produced by the piston membrane pumps are sufficiently suppressed by the frictional resistance within the press itself so that connection of the two systems through line 24 does not cause any significant mutual disturbance of the two pumps.

The two groups of filter chambers at this rear end of the filter press may also be connected, through a valve 25, to a large volume accumulator 26 which serves to suppress additional pressure thrusts. Also, during the operation of the filter press unfiltered material can be stored in this accumulator under pressure and used to charge the press at the beginning of the subsequent filtering operation.

Figure 4:
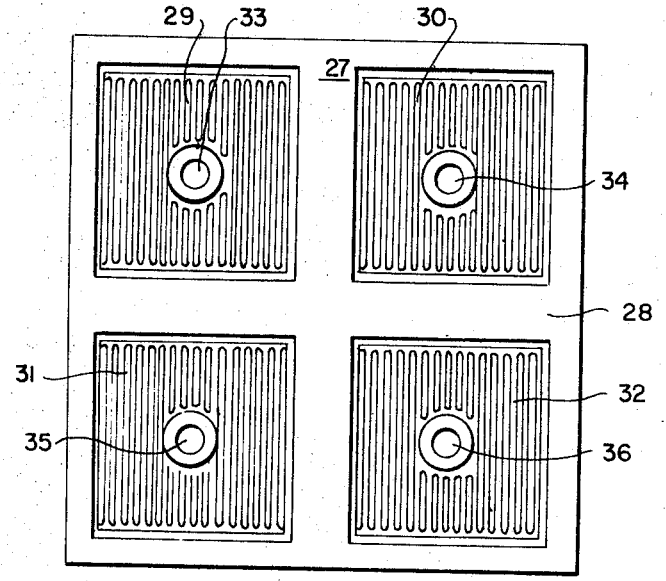
FIG. 4 is an elevational view similar to FIG. 1 but showing another embodiment of the present invention.

FIG. 4 illustrates a modified filter press for use with the present invention. This filter press is similar to the press of FIGS. 1 and 2 except that the separating wall 3 is replaced by a pair of mutually perpendicular separating walls 27 and 28 which form four recessed channels 29, 30, 31 and 32. These channels include influent openings 33, 34, 35 and 36, respectively. In view of the added support offered by the cross or horizontal separating wall 28, additional spacing elements may be omitted.

Figures 5, 6:
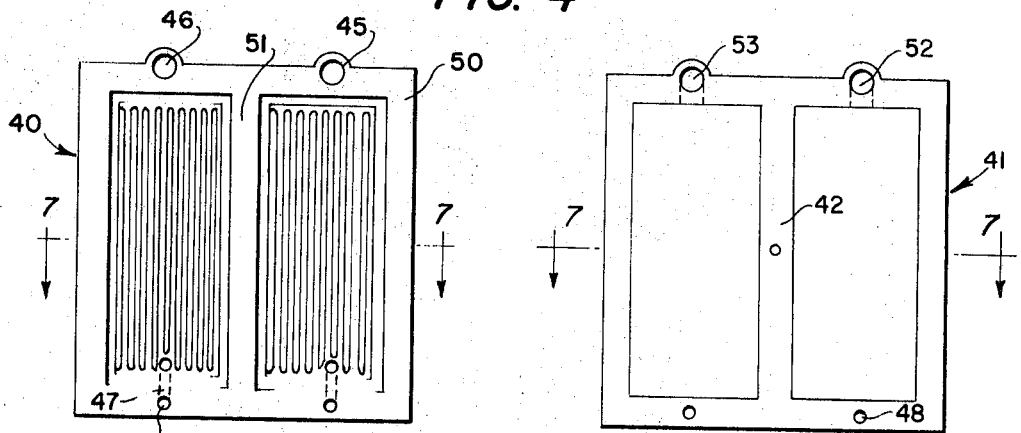
FIG. 5 is an elevational view similar to FIG. 1 and showing still another modification of the present invention.
FIG. 6 is an elevational view of an element for use with the embodiment of FIG. 5.
Figure 7:
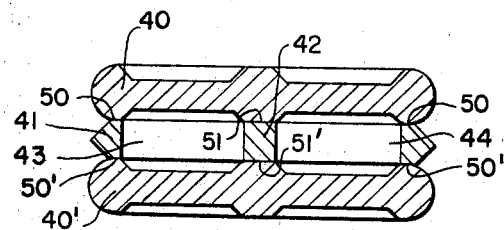
FIG. 7 shows an assembled set of adjacent filter plates constructed in accordance with the embodiment of FIGS. 5 and 6 and showing two adjacent filter plates taken along the lines 7—7 of FIG. 5 and a frame element taken along line 7—7 of FIG. 6.

In the embodiment of FIGS. 5 through 7 the filter plates 40 and 40' are spaced apart by means of a frame element 41, the outer portion of which sealingly engages the opposed raised outer borders 50 and 50' on the two adjacent filter plates while an intermediate central separating wall 41 sealingly engages the raised separating walls 51 and 51'. This arrangement provides filtering chambers 43 and 44 which are enlarged in a direction perpendicular to the filter plates. In this embodiment the influent material is introduced through passageways formed in the outer borders of the filter plates and of the frame element 41. The filter chamber 44 is fed with influent through a channel formed by aligned openings 45 in the filter plate and 52 in the frame element. Similarly, the filter chamber 43 is fed through a passageway comprised of aligned opening 46 in the frame 40 and 53 in the frame element 41. The separate groups of aligned chambers are then operated in the same manner as the embodiment of FIGS. 1 and 2 and as shown in FIG. 3.

Purified liquid is discharged through openings 47 which may be directed individually, to the exterior of the filter press, or they may be connected to a common channel 48 for discharge at a common point.

Although the invention has been described in considerable detail with respect to preferred embodiments thereof, it will be apparent that the invention is capable of numerous modifications and variations apparent to those skilled in the art without departing from the spirit and scope of the invention.

We claim:

1. A filter press comprising: a pair of end plates, a plurality of adjacent filter plates located between said end plates and arranged to be forced together as the end plates are moved towards each other, a filter area between adjacent filter plates for receiving influent material to be filtered, each filter plate having raised outer borders which form at least a part of a fluid tight outer seal with a similar raised outer border of adjacent filter plates, each filter area having at least one separating wall raised from each filter plate forming said filter area to form at least a part of a fluid tight partition dividing that filter area into at least a first filter chamber and a second filter chamber, said first and second filter chambers thus being sealed from each other to substantially prevent liquid from passing between said filter chambers, all of said first chambers of the filter press being in fluid communication with each other and forming a first group of chambers, and all of said second chambers of the filter press being in fluid communication with each other and forming a second group of chambers, supply means for feeding influent material separately into each group of filter chambers such that influent material entering the filter press enters only one of said groups of filter chambers, and outlet means for removing filtered liquid from the filter chambers of the filter press.

2. A filter press according to claim 1, wherein each chamber includes a separate outlet passage for discharge of filtered liquid.

3. A filter press according to claim 1, wherein said outer borders and said separating walls on each adjacent filter plate are raised by the same uniform amount, and including a frame member located between said adjacent plates to complete the outer seal, to complete the fluid tight partition and to enlarge the said chambers with respect to their size in the absence of said frame member.

4. A filter press according to claim 3, including an inlet passage through said borders and said frame element for introducing influent material separably into said chambers.

5. A filter press according to claim 1, wherein said separating walls in each filter area engage each other to form said fluid tight partition dividing said filter area into said chambers.

6. A filter press according to claim 5, including a pair of said raised separating walls on the same side of each filter plate and at generally right angles to each other and forming at least a part of a fluid tight partition with corresponding separating walls on the adjacent filter plate, said fluid tight partition dividing the filter area into four of said filter chambers, each sealed from the other chambers.

7. A filter press according to claim 1 including an accumulator connected to both said groups of chambers through a single valve.

8. A filter press according to claim 7, including an accumulator connected to each group of chambers separately through a separate valve.

9. A filter press according to claim 1, wherein all said filter plates include (a) a first opening placing all said first chambers in fluid communication with each other and with a first supply means, and (b) a second opening placing all said second chambers in fluid communication with each other, and with a second supply means.

10. A filter press according to claim 9, wherein said first and second supply means comprise first and second fluid pumps.

11. A filter press according to claim 10, wherein said supply means supply influent at a first end of the press, and including a connecting means for placing said first and second groups of chambers into fluid communication with each other at the end of the filter press remote from the supply means.

12. A filter press according to claim 10, wherein said supply means supply influent at a first end of the press, and including a connecting means for placing said first and second groups of chambers into fluid communication with each other at the same end of the filter press as the supply means.

References Cited

UNITED STATES PATENTS

| | | | |
|---|---|---|---|
| 2,594,518 | 4/1952 | Teale | 210—231 |
| 2,989,187 | 6/1961 | Demeter | 210—227 |
| 3,018,894 | 1/1962 | Brown | 210—231 |
| 3,330,414 | 7/1967 | Mecky | 210—227 |
| 3,502,210 | 3/1970 | Busse et al. | 210—224 X |

FOREIGN PATENTS

| | | |
|---|---|---|
| 33,944 | 1/1908 | Austria. |
| 753,190 | 8/1933 | France. |

REUBEN FRIEDMAN, Primary Examiner

T. A. GRANGER, Assistant Examiner